US008625215B1

(12) United States Patent
Burd et al.

(10) Patent No.: US 8,625,215 B1
(45) Date of Patent: Jan. 7, 2014

(54) METHOD AND SYSTEM FOR COMPENSATING FOR ADJACENT TRACKS DURING WRITING OF DATA

(75) Inventors: Gregory Burd, San Jose, CA (US); Nitin Nangare, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 44 days.

(21) Appl. No.: 13/413,049

(22) Filed: Mar. 6, 2012

Related U.S. Application Data

(60) Provisional application No. 61/454,699, filed on Mar. 21, 2011.

(51) Int. Cl.
*G11B 27/36* (2006.01)

(52) U.S. Cl.
USPC .................... 360/31; 360/39; 360/53; 360/55

(58) Field of Classification Search
None
See application file for complete search history.

(56) References Cited

U.S. PATENT DOCUMENTS

| | | | |
|---|---|---|---|
| 6,185,063 B1 | 2/2001 | Cameron | |
| 6,442,705 B1 | 8/2002 | Lamberts | |
| 6,549,362 B1 | 4/2003 | Melrose et al. | |
| 6,697,209 B2 | 2/2004 | Hughes et al. | |
| 6,724,702 B2 | 4/2004 | Taguchi et al. | |
| 6,862,155 B2 | 3/2005 | Yang et al. | |
| 6,963,528 B2 | 11/2005 | Ogura | |
| 7,082,007 B2 | 7/2006 | Liu et al. | |
| 7,126,890 B2 | 10/2006 | Learned et al. | |
| 7,209,305 B2 | 4/2007 | Chan et al. | |
| 7,218,665 B2 | 5/2007 | McElwain | |
| 7,423,828 B2 * | 9/2008 | Emo et al. ....................... | 360/60 |
| 7,457,075 B2 | 11/2008 | Liu et al. | |
| 7,567,397 B2 | 7/2009 | Lu | |
| 7,768,729 B2 | 8/2010 | Moser et al. | |
| 7,965,465 B2 | 6/2011 | Sanvido et al. | |
| 8,014,097 B1 | 9/2011 | Sanvido | |
| 8,125,723 B1 | 2/2012 | Nichols et al. | |
| 8,139,301 B1 | 3/2012 | Li et al. | |
| 8,259,409 B2 | 9/2012 | Braganca et al. | |
| 8,300,339 B1 | 10/2012 | Nangare et al. | |
| 2003/0218955 A1 | 11/2003 | Isshiki et al. | |
| 2007/0177292 A1 | 8/2007 | Bui et al. | |

* cited by examiner

*Primary Examiner* — Muhammad N Edun

(57) ABSTRACT

A method of writing data to a storage device includes writing current data to a first track of data, monitoring write head position, and on detection of encroachment of the write head position on a second track of previously written data, using the current data to recover the previously written data on the second track, and rewriting the current data to the first track. A storage controller includes a device controller that writes data to a current track of data on a storage device. The device controller monitors write head position. On detection of encroachment of the write head position on a second track of previously written data uses the current data to recover the previously written data on the second track, and rewrites the current data to the first track. A storage system includes a storage medium having a plurality of tracks of data thereon, and a storage controller.

19 Claims, 4 Drawing Sheets

METHOD AND SYSTEM FOR COMPENSATING FOR ADJACENT TRACKS DURING WRITING OF DATA

CROSS REFERENCE TO RELATED APPLICATIONS

This claims the benefit of copending, commonly-assigned U.S. Provisional Patent Application No. 61/454,699, filed Mar. 21, 2011, which is hereby incorporated by reference herein in its entirety.

FIELD OF USE

This disclosure relates to a method and system for writing data in an arrangement of tracks on a storage medium by a write head that moves relative to the surface of the storage medium. More particularly, this disclosure relates to compensating, during a write operation, for encroachment by the write signal onto an adjacent track or tracks.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In magnetic recording, as one example of a type of recording in which reading and writing are performed by a head that moves relative to the surface of the storage medium, data may be written in circular tracks on a magnetic disk. In many magnetic recording systems, minimum track pitch is limited by the write head width, while the read head is designed to be narrower than the write head so that reading can occur without picking up signals from any adjacent track. In addition, guard bands—empty bands on either side of each track—are provided to help prevent data on one track from being overwritten during writing of an adjacent track because of write head positioning errors.

In other magnetic recording systems, in order to increase recording densities, it is desirable to shrink the track pitch and reduce or remove the guard bands between the tracks, which allows more tracks to fit on the recording medium. For example, in "Shingle Write Recording," also known as "Shingled Magnetic Recording," the tracks are written so that one track partially overlaps the previous track. In such a system, track pitch theoretically may be arbitrarily small. In practice, in a Shingled Magnetic Recording system, the track pitch is limited by the read head width. If track pitch is narrower than the read head width, then the read head may pick up a significant amount of signals from one or more adjacent tracks, leading to low data reliability.

In order to further reduce the track pitch beyond the read head width, it is necessary to mitigate the interference picked up from adjacent tracks during a read operation. If the component of the adjacent track picked up by the read head is sufficiently small, it may be possible to use knowledge of the data written on the adjacent track to carry out ITI cancellation—i.e., cancellation of "inter-track interference (ITI)."

Copending, commonly-assigned U.S. patent application Ser. No. 12/882,802, filed Sep. 15, 2010 and hereby incorporated by reference herein in its entirety, describes a method and system for compensating for ITI during reading by using actual or estimated data from the adjacent track.

SUMMARY

A method of writing data to a storage device includes writing current data to a first track of data, monitoring write head position, and on detection of encroachment of the write head position on a second track of previously written data, using the current data to recover the previously written data on the second track, and rewriting the current data to the first track.

A storage controller includes a device controller, and a write channel including a write head. The storage medium has a plurality of tracks of data thereon, and when the device controller writes data to a current track of data on the storage device, the device controller monitors write head position, and on detection of encroachment of the write head position on a second track of previously written data uses the current data to recover the previously written data on the second track, and rewrites the current data to the first track.

A storage system includes a storage medium having a plurality of tracks of data thereon, and a storage controller. The storage controller includes a device controller, and a write channel including a write head. The storage medium has a plurality of tracks of data thereon, and when the device controller writes data to a current track of data on the storage device, the device controller monitors write head position, and on detection of encroachment of the write head position on a second track of previously written data, uses the current data to recover the previously written data on the second track, and rewrites the current data to the first track.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

This disclosure is a method and system for repairing the partial overwriting of a previously-written track, that is adjacent to a track that is currently being written, when head-positioning error causes the current track to encroach on and partially overwrite the previously-written track. Although above-incorporated application Ser. No. 12/882,802 describes a technique for cancelling ITI during reading, such ITI cancellation techniques become less effective in situations where the encroaching track has itself been overwritten (e.g., by the writing of new data) subsequent to the encroachment event. While some shingled recording formats and other small-track-pitch recording formats group a band of sectors in adjacent tracks and allow writing of each sector only once before the entire band is erased, thereby increasing the effectiveness of ITI cancellation techniques during read operations, the technique of the present disclosure is effective even for recording formats (such as "conventional" recording of non-overlapping tracks) that do not limit rewriting.

Such increased effectiveness of ITI cancellation may be achieved according to the current disclosure by carrying out ITI cancellation during writing rather than during reading. By detecting a head positioning error resulting in encroachment on, and overwriting of, an adjacent track almost as soon as it occurs, the technique according to the present disclosure can stop writing, and can read and store the portion of the current track that has encroached upon the adjacent track. The stored overwriting portion may be used to repair or recover the adjacent track by cancelling ITI caused by the overwriting data, and may then again be written to the current track, preferably after the head positioning error has been reduced or corrected.

Figure 1:
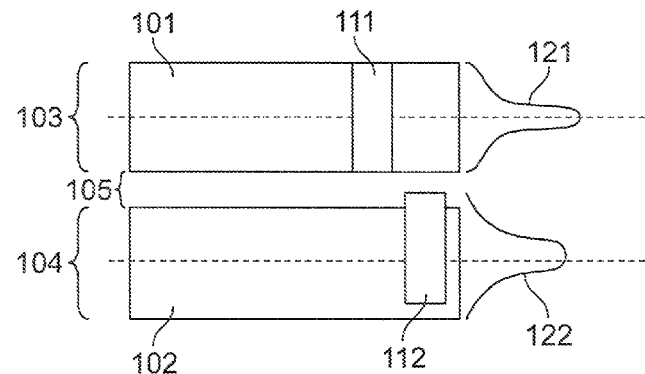
FIG. 1 is a representation of data written on adjacent tracks of a recording medium.

FIG. 1 shows two sectors 101, 102 written on adjacent tracks 103, 104. Each write head 111, 112 (which may be the same write head at different times) is slightly narrower than the track 103 or 104. Because of a phenomenon known as "side writing", each head 111, 112 may nevertheless write substantially the full track width, and therefore is drawn in FIG. 1 as though it were the substantially the same width as track 103, 104. Distribution 121 shows that for track 103, head 111 writes substantially on-track. Similarly, distribution 122 shows that for track 104, head 112, which is currently subject to a positioning error, also writes substantially on-track but has a greater frequency of off-track write events. However, the presence of guard band 105 mitigates the effect of off-track events, because those events do not encroach on the adjacent track but only onto the guard band.

In order to increase storage density, it is desirable to decrease the width of guard band 105. However, such a decrease is likely to increase the occurrence of ITI, because an off-track event—e.g., on track 104—would be more likely to encroach on an adjacent track (such as track 103). Without a restriction on when a track can be rewritten as discussed above, ITI cancellation at read-time is not a reliable solution to such encroachments, as illustrated in FIG. 2.

Figure 2:
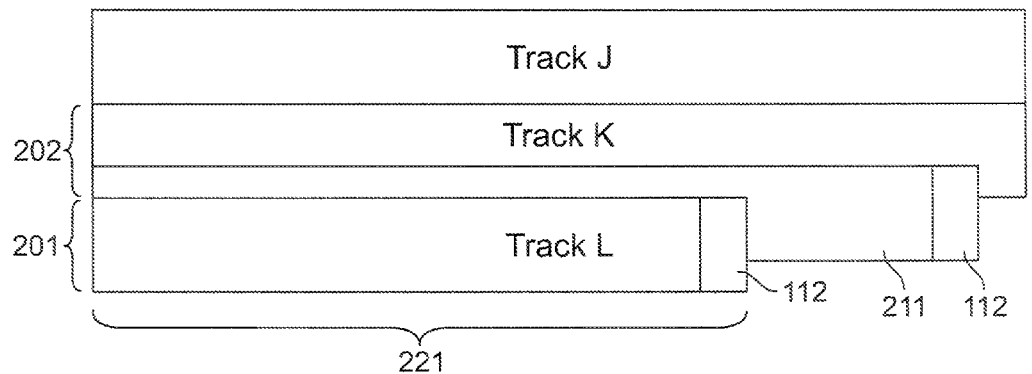
FIG. 2 is a representation of data written on adjacent tracks of a recording medium, where data from one track has encroached on an adjacent track.

As seen in FIG. 2, an attempt to write to Track L (201) has resulted in an encroachment 211 by head 112 onto Track K (202), partially overwriting and corrupting data previously written to Track K (202). Subsequent to the occurrence of encroachment 211, additional data 221 have been written to Track L (201) by head 112 in the correct position. Therefore, the data that caused encroachment 211 are no longer available to support ITI cancellation of encroachment 211 during reading of Track K (202). Therefore, performing ITI cancellation when Track K (202) is read will be less effective, or possibly ineffective.

Figure 4:
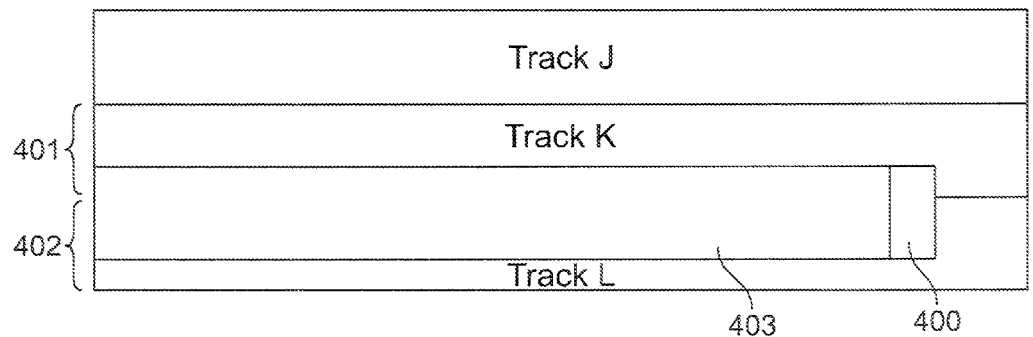
FIG. 4 is a representation of the writing, according to an embodiment of this disclosure, of data on a storage medium.
Figure 3:
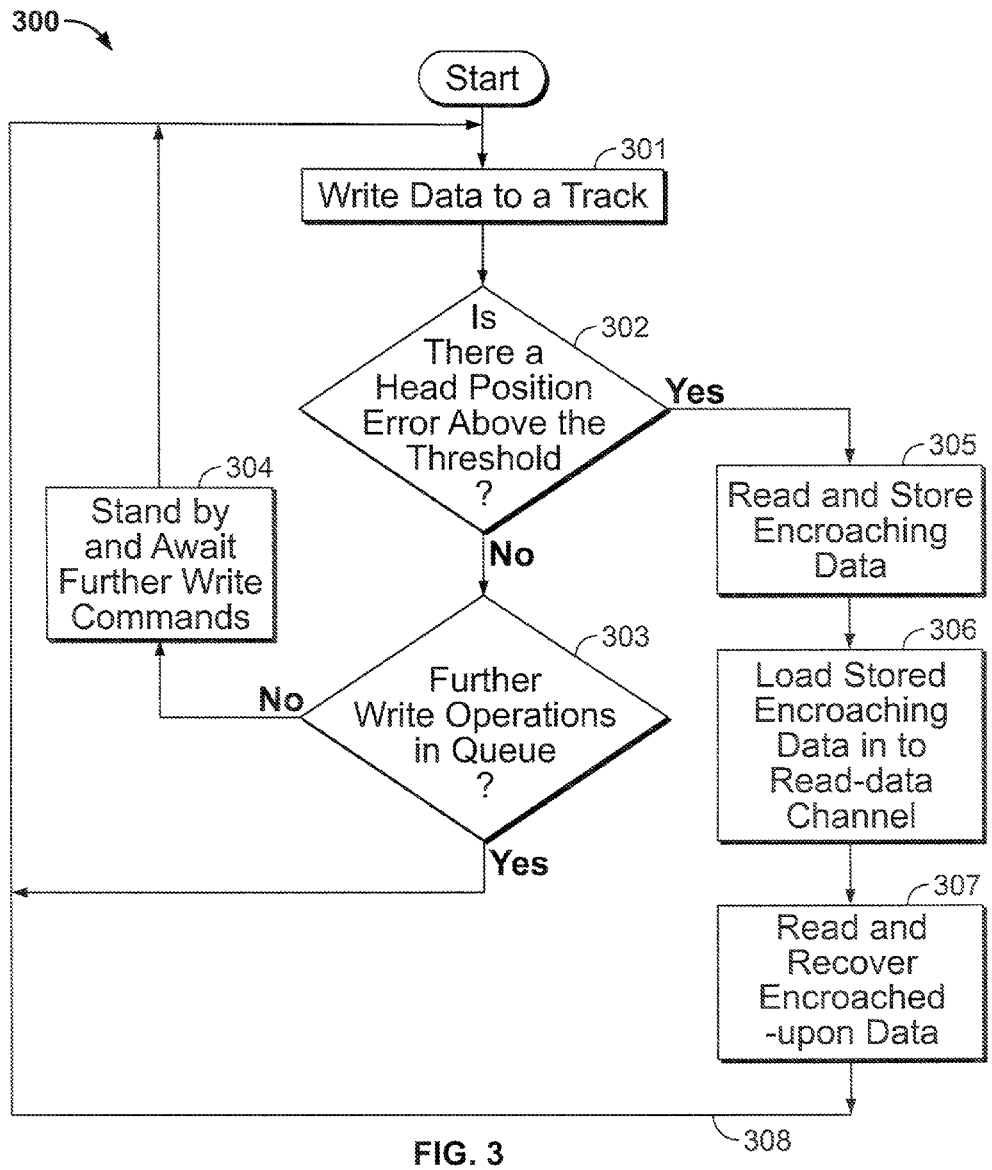
FIG. 3 is a flow diagram of a process according to an embodiment of this disclosure.

However, if ITI cancellation is performed during the writing process, substantially as the ITI occurs, there will not have been an opportunity for the encroaching data to have been overwritten, and therefore effective ITI cancellation should be possible, as diagrammed in FIG. 3, with reference to FIG. 4.

Process 300 (FIG. 3) begins at 301 where data are written to Track K (401). After, or contemporaneously with, each write operation, including write operation 301, the position of write head 400 is monitored. For example, at test 302, the write head servo mechanism may provide a position error signal (PES) that may be monitored. A threshold value for the PES may be determined below which no action need be taken.

The presence of some guard band, similar to guard band 105, and the width of that guard band, are some of the factors that affect the value of the threshold. Some degree of encroachment beyond the guard band also may be tolerable, depending on the criticality of the data and robustness of other available error correction techniques.

In any event, in this pass, at test 302 there was no head position error in the writing of Track K (401) and so at test 303 it is determined whether or not there are any further writing operations queued up. If not, process 300 moves to a standby condition 304 to await further write commands. If at test 303 there are further write operations queued up (such as, in this case, the writing of Track L (402)), then process 300 loops back to step 301 to perform the next write operation (in this case, the writing of Track L (402)), followed again by test 302.

Figure 5:
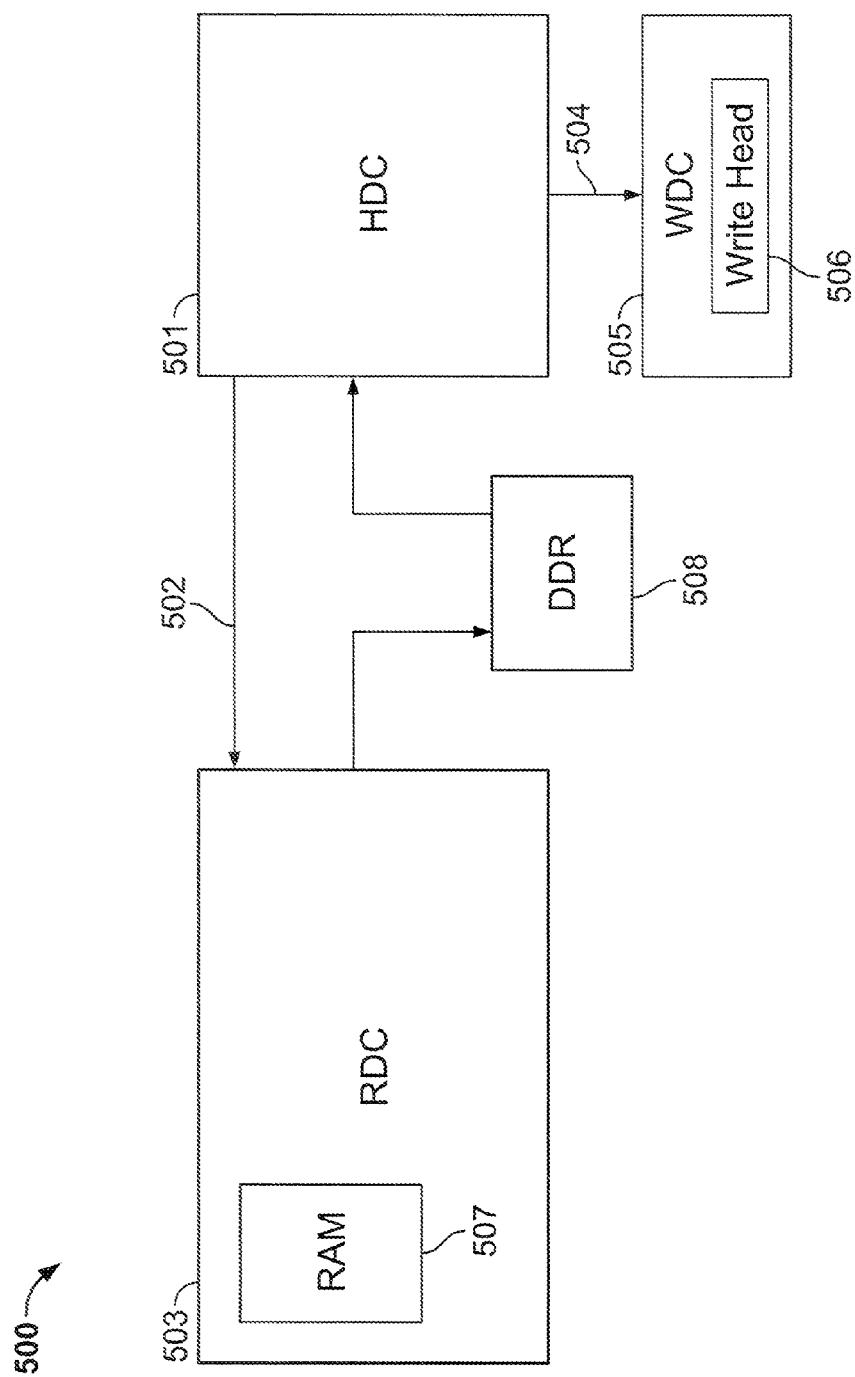
FIG. 5 is a schematic view of apparatus in accordance with an embodiment of this disclosure.

In this pass, test 302 will indicate a head position error beyond the tolerable threshold, and process 300 will, at 305, begin ITI cancellation, during which the data 403 intended for Track L (402) that encroached on Track K (401) may be read and stored in a buffer 507 or 508 (FIG. 5). Operation 305 may be optional, because the device controller (not shown) will have just had those data in a buffer in order to write them at 301. However, because the controller ordinarily would not have known in advance that it would need those data, it may not have retained them.

Next, at 306, the data 403 read from the encroachment 211 of Track L (402) onto Track K (401) are loaded into the read-data channel (RDC) 503 by the controller 501 (FIG. 5) for use in ITI cancellation. Again, this operation may be unnecessary as a separate operation, because the RDC will have just read the data to fulfill the read request at 305. However, because the RDC ordinarily would not know that the read request is for ITI cancellation (as opposed, e.g., to a simple user data request), it would not necessarily have retained the data; if the data had been retained, operation 306 merges with operation 305.

Next, at 307, ITI cancellation is performed on Track K (401) using the data 403 from the encroachment 211 as read at 305/306. Any suitable ITI cancellation technique or other repair technique may be used. For example, the technique in above-incorporated application Ser. No. 12/882,802 is one example of a technique that may be used; however, other techniques exist and may be used instead.

After Track K (401) has been recovered, process 300 returns at 308 to 301 to again write Track L (402), using the encroachment data already stored in the RDC during operations 305/306. Presumably, on this pass the head position has been corrected and the data are properly written to Track L (402). However, process 300 continues as above, monitoring for errors, which may occur at this pass (in which case, ITI cancellation is performed again using the same data) or on a later pass (in which case, ITI cancellation is performed using different data).

As discussed above, because position error detection and ITI cancellation or repair are performed during writing, before the encroaching data can be overwritten, ITI cancellation or repair according to embodiments of this disclosure can be used in ordinary recording where there is no restriction on overwriting of tracks. As also discussed above, because shingled recording schemes typically prevent overwriting of tracks until a band of tracks has been erased, ITI cancellation or repair according to embodiments of this disclosure is not necessary in shingled recording schemes. Nevertheless, ITI cancellation or repair according to embodiments of this disclosure may be used with shingled recording schemes; however, it would be unlikely to provide a measurable performance improvement.

It will be apparent that ITI cancellation or repair according to embodiments of this disclosure can affect writing throughput, because some writing operations will have to be repeated, with additional time needed between passes for reading of encroaching data. However, because the availability of ITI cancellation or repair according to embodiments of this disclosure allows guard band 105 to be made smaller, some reduction of throughput is acceptable to gain increased recording density. One criterion for choosing minimum guard band size when using embodiments of this disclosure would be to choose that guard band size that causes, on writing, a retry rate (due to head position error) comparable to the retry rate that occurs on reading without using embodiments of this disclosure. There should be few retries on reading because errors are corrected on writing.

FIG. 5 shows a schematic representation of apparatus 500 for carrying out such methods, which may be used in a storage device such as, e.g., a disk drive. The storage device may have a controller 501 (e.g., a hard disk controller, or HDC, where the device is a hard disk drive) which controls various functions and components of the device (not all of which are shown in FIG. 5). Controller 501 may send read commands 502 to read-data channel 503, which may include at least one detector—e.g., a SOVA detector (not shown)—and at least one decoder—e.g., a Viterbi decoder (not shown). Controller 501 may send write commands 504 to write-data channel 505 including a write head 506.

In accordance with embodiments of the present invention, controller 501 also may include memory, such as RAM 507, for storing decoded data (e.g., NRZ data) from one or more previously-read tracks. If data from a track is needed to repair or recover an adjacent track, and/or needs to be rewritten after repair or recovery of an adjacent track, controller 501 can store the data in RAM 507 and retrieve it as necessary. Alternatively, controller 501 can store the data in separate DDR memory 508 for retrieval as necessary.

Figure 6:
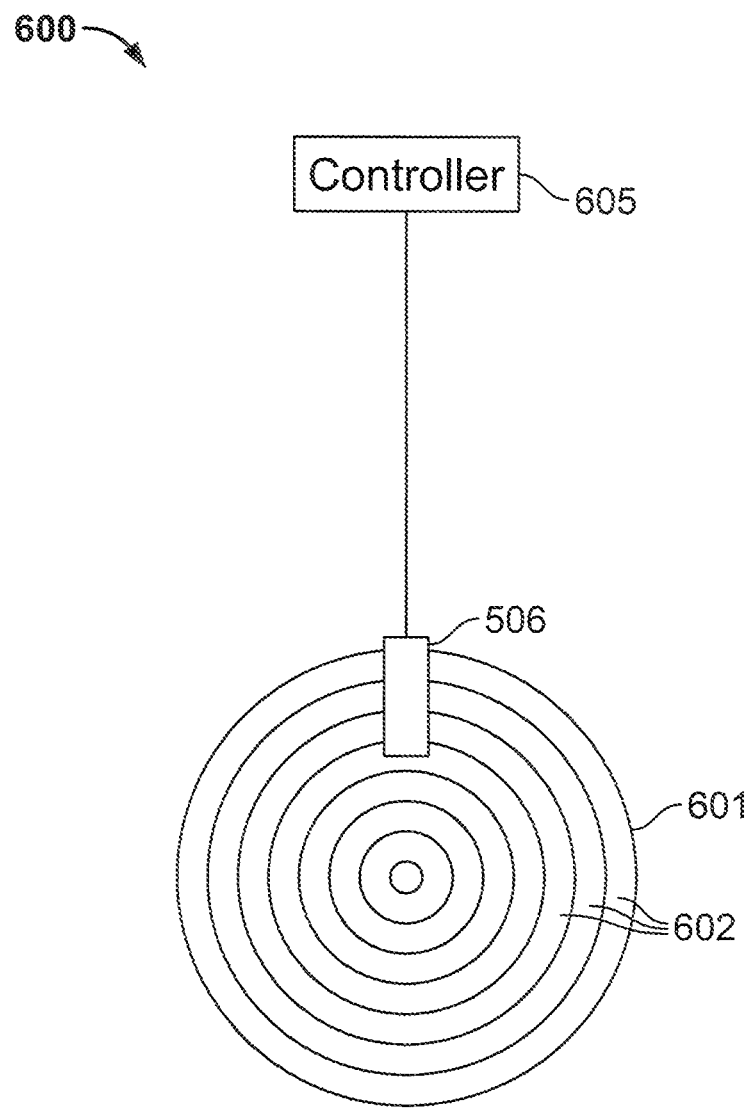
FIG. 6 is a schematic view of a system in accordance with an embodiment of this disclosure.

A data storage system 600 (FIG. 6) may include a storage medium such as a hard disk 601 having a plurality of tracks 602 and controller apparatus 605, which may, for example, be apparatus 500, having head 506.

Thus it is seen that a data storage system, and a method of storing data, in which ITI cancellation or similar data repair can be performed before an encroaching track is overwritten, have been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of writing data to a storage device, the method comprising:
    writing current data to a first track of data;
    monitoring write head position during the writing of the current data to the first track of data; and
    on detection of encroachment of the write head position on a second track of previously written data:
    stopping the writing of the current data to the first track of data;
    after the stopping, using the current data to recover the previously written data on the second track; and
    rewriting the current data to the first track after recovery of the previously written data on the second track.

2. The method of claim 1 wherein:
    the writing of the current data comprises storing the current data in a buffer; and
    the using of the current data comprises reading the current data from the buffer.

3. The method of claim 2 wherein the rewriting comprises again reading the current data from the buffer.

4. The method of claim 1 wherein the using of the current data comprises re-reading the current data from first track.

5. The method of claim 4 wherein:
    the re-reading the current data from the first track comprises storing the current data in a buffer; and
    the rewriting comprises reading the current data from the buffer.

6. The method of claim 1 wherein:
    the writing of the current data comprises storing the current data in a buffer; and
    the rewriting comprises reading the current data from the buffer.

7. The method of claim 1 wherein the monitoring write head position comprises comparing a position error signal to a threshold value.

8. A storage controller comprising:
    a device controller; and
    a write channel including a write head; wherein:
    the storage medium has a plurality of tracks of data thereon; and
    when said device controller writes data to a current track of data on said storage device, said device controller:
    monitors write head position, and
    on detection of encroachment of the write head position on a second track of previously written data:
    stops the writing of the current data to the first track of data,
    after stopping the writing of the current data to the first track of data, uses the current data to recover the previously written data on the second track, and
    rewrites the current data to the first track after recovery of the previously written data on the second track.

9. The storage controller of claim 8 further comprising a buffer; wherein:
    the writing of the current data comprises storing the current data in the buffer; and
    the device controller uses the current data by reading the current data from the buffer.

10. The storage controller of claim 9 wherein the device controller rewrites the current data after again reading the current data from the buffer.

11. The storage controller of claim 8 wherein the device controller uses the current data by re-reading the current data from first track.

12. The storage controller of claim 11 wherein the device controller:
    stores the current data in a buffer; and
    re-reads the current data from the first track by reading the current data from the buffer; and
    rewrites the current data to the first track after re-reading the current data from the buffer.

13. The storage controller of claim 8 wherein the device controller:
    stores the current data in a buffer; and
    rewrites the current data to the first track after re-reading the current data from the buffer.

14. A storage system comprising:
    a storage medium having a plurality of tracks of data thereon; and
    a storage controller comprising:
    a device controller, and a write channel including a write head; wherein:

the storage medium has a plurality of tracks of data thereon; and when said device controller writes data to a current track of data on said storage device, said device controller:

monitors write head position, and on detection of encroachment of the write head position on a second track of previously written data:

stops the writing of the current data to the first track of data, after stopping the writing of the current data to the first track of data, uses the current data to recover the previously written data on the second track, and rewrites the current data to the first track after recovery of the previously written data on the second track.

15. The storage system of claim 14 further comprising a buffer; wherein:

the writing of the current data comprises storing the current data in the buffer; and the device controller uses the current data by reading the current data from the buffer.

16. The storage system of claim 15 wherein the device controller rewrites the current data after again reading the current data from the buffer.

17. The storage system of claim 14 wherein the device controller uses the current data by re-reading the current data from first track.

18. The storage system of claim 17 wherein the device controller:

stores the current data in a buffer; and re-reads the current data from the first track by reading the current data from the buffer; and rewrites the current data to the first track after re-reading the current data from the buffer.

19. The storage system of claim 14 wherein the device controller:

stores the current data in a buffer; and rewrites the current data to the first track after re-reading the current data from the buffer.

* * * * *